US012706308B2

(12) United States Patent
Ying et al.

(10) Patent No.: US 12,706,308 B2
(45) Date of Patent: Aug. 11, 2026

(54) CATHODE MATERIAL AND A METHOD OF PREPARING THE SAME

(71) Applicant: AGENCY FOR SCIENCE, TECHNOLOGY AND RESEARCH, Singapore (SG)

(72) Inventors: Jackie Y. Ying, Singapore (SG); Jian Liang Cheong, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 1148 days.

(21) Appl. No.: 17/618,832

(22) PCT Filed: Jun. 2, 2020

(86) PCT No.: PCT/SG2020/050319

§ 371 (c)(1),
(2) Date: Dec. 13, 2021

(87) PCT Pub. No.: WO2020/251472

PCT Pub. Date: Dec. 17, 2020

(65) Prior Publication Data

US 2022/0293946 A1 Sep. 15, 2022

(30) Foreign Application Priority Data

Jun. 13, 2019 (SG) .......................... 10201905403Y

(51) Int. Cl.
*H01M 4/58* (2010.01)
*H01M 4/02* (2006.01)
(Continued)

(52) U.S. Cl.
CPC ......... *H01M 4/5815* (2013.01); *H01M 4/622* (2013.01); *H01M 4/625* (2013.01);
(Continued)

(58) Field of Classification Search
CPC .... H01M 4/5815; H01M 4/622; H01M 4/625; H01M 4/80; H01M 4/0404;
(Continued)

(56) References Cited

U.S. PATENT DOCUMENTS

2017/0352909 A1* 12/2017 Ainsworth .......... H01M 4/5815

FOREIGN PATENT DOCUMENTS

CN 110265646 A 9/2019

OTHER PUBLICATIONS

Wu et al. "A high efficiency N/P co-doped graphene/CNT @ porous carbon hybrid matrix as a cathode host for high performance lithium-sulfur batteries" 2017 J Mater. Chem A . 5. pp. 20458-20472.*

(Continued)

*Primary Examiner* — Kiran Quraishi Akhtar
(74) *Attorney, Agent, or Firm* — WOMBLE BOND DICKINSON (US) LLP

(57) ABSTRACT

There is provided a cathode material comprising a layer of sulfur species dispersed within or thereon a porous matrix comprising a first conducting carbon material, a second conducting carbon material and a binder, wherein the second conducting carbon material is carbon fiber or carbon nanotube. There is also provided a cathode material comprising a layer of sulfur species dispersed within or thereon a porous matrix comprising a first conducting carbon material, a second conducting carbon material and a binder, wherein said porous matrix is interconnected with uniform pores. There are also provided methods for preparing the above cathode material(s).

22 Claims, 12 Drawing Sheets

(51) Int. Cl.
*H01M 4/62* (2006.01)
*H01M 4/80* (2006.01)
*H01M 10/052* (2010.01)

(52) U.S. Cl.
CPC .......... *H01M 4/80* (2013.01); *H01M 10/052* (2013.01); *H01M 2004/021* (2013.01); *H01M 2004/028* (2013.01)

(58) Field of Classification Search
CPC ...... H01M 4/1397; H01M 4/136; H01M 4/38; H01M 4/621; H01M 10/052; H01M 2004/021; H01M 2004/028; Y02E 60/10
See application file for complete search history.

(56) References Cited

OTHER PUBLICATIONS

Gao, F. et al., Graphene/Carbon Nanotubes Composite as a Polysulfide Trap for Lithium-Sulfur Batteries. Int. J. Electrochem. Sci., Mar. 10, 2019, vol. 14, pp. 3301-3314.*
Wu, H. et al., A high-efficiency N/P co-doped graphene/ CNT@porous carbon hybrid matrix as cathode host for high performance lithium-sulfur batteries. J. Mater. Chem. A, Sep. 6, 2017, vol. 5, pp. 20458-20472.*
Cleaver, Tom et al., "Commercializing Lithium Sulfur Batteries: Are We Doing the Right Research?" Journal of The Electrochemical Society, Oct. 31, 2017, 5 pages.
Zhang, Sheng S., "Liquid Electrolyte Lithium/Sulfur Battery: Fundamental Chemistry, Problems, and Solutions," Journal of Power Sources, 231 (2013), 10 pages.
Manthiram, Arumugam et al., "Rechargeable Lithium-Sulfur Batteries," Chemical Reviews, (2014) 114, 37 pages.
Fang, Ruopian et al., "More Reliable Lithium-Sulfur Batteries: Status, Solutions and Prospects," Advanced Materials, (2017) 29, 25 pages.
Elazari, Ran et al., "Morphological and Structural Studies of Composite Sulfur Electrodes Upon Cycling By HRTEM, AFM and Raman Spectroscopy," Journal of The Electrochemical Society, 157, (2010), 8 pages.
Li, Gaoran et al., "Revisiting the Role of Polysulfides in Lithium-Sulfur Batteries," Advanced Materials, (2018) 30, 19 pages.
Zhang, Sheng S. et al., "A New Direction For the Performance Improvement of Rechargeable Lithium/Sulfur Batteries," Journal of Power Sources, 200 (2012), 6 pages.
Fu, Yongzhu et al., "Highly Reversible Lithuim/Dissolved Polysulfide Batteries with Carbon Nanotube Electrodes," Angewandte Communications, (2013), 52, 6 pages.
Zu, Chenxi et al., "Highly Reversible Li/Dissolved Polysulfide Batteries With Binder-Free Carbon Nanofiber Electrodes," Journal of Materials Chemistry A, (2013) 1, 6 pages.
Yang, Yuan et al., "A Membrane-Free Lithium/Polysulfide Semi-Liquid Battery For Large-Scale Energy Storage," Energy & Environmental Science, (2013), 6, 7 pages.
Zu, Chenxi et al., "High-Performance Li/Dissolved Polysulfide Batteries With an Advanced Cathode Structure and High Sulfur Content," Advanced Energy Materials, (2014) 4, 6 pages.
Pu, Xiong et al., "Liquid-Type Cathode Enabled By 3D Sponge-Like Carbon Nanotubes For High Energy Density and Long Cycling Life of Li—S Batteries," Advanced Materials, (2014), 26, 6 pages.
Fang, Ruopian et al., "An Integrated Electrode/Separator With Nitrogen and Nickel Functionalized Carbon Hybrids For Advanced Lithium/Polysulfide Batteries," Elsevier Ltd., (2016), 8 pages.
Li, Xiaolong et al., "Enhanced Performances of Li/Polysulfide Batteries With 3D Reduced Graphene Oxide/Carbon Nanotube Hybrid Aerogel as the Polysulfide Host," Elsevier Ltd., (2016), 7 pages.
Xu, Rui et al., "Role of Polysulfides in Self-Healing Lithium-Sulfur Batteries," Advanced Energy Materials, (2013) 3, 6 pages.
Demir-Cakan, Rezan et al., "Li—S Batteries: Simple Approaches for Superior Performance," Energy & Environmental Science, (2013), 6, 7 pages.
Han, Kai et al., "Free-Standing Nitrogen-Doped Graphene Paper As Electrodes For High-Performance Lithium/Dissolved Polysulfide Batteries," ChemSusChem, (2014), 7, 9 pages.
Zhou, Guangmin et al., "Free-Standing TiO2 Nanowire-Embedded Graphene Hybrid Membrane for Advanced Li/Dissolved Polysulfide Batteries," Elsevier Ltd., (2014), 10 pages.
Zhou, Guangmin et al., "Long-Life Li/Polysulphide Batteries With High Sulphur Loading Enabled By Lightweight Three-Dimensional Nitrogen/Sulphur-Codoped Graphene Sponge," Nature Communications, Jul. 2015, 11 pages.
Babu, Ganguli et al., "Transition Metal Dichalcogenide Atomic Layers for Lithium Polysulfides Electrocatalysis," Journal of the American Chemical Society, Aug. 19, 2016, 8 pages.
Luo, Shuwen et al., "Freestanding Reduced Graphene Oxide-Sulfur Composite Films for Highly Stable Lithium-Sulfur Batteries," The Royal Society of Chemistry, (2017), 9, 6 pages.
Kraytsberg, Alexander et al., "Conveying Advanced Li-Ion Battery Materials Into Practice The Impact of Electrode Slurry Preparation Skills," Advanced Energy Materials, (2016), 6, 23 pages.
Rauh, R. D. et al., "A Lithium/Dissolved Sulfur Battery With An Organic Electrolyte," EIC Corporation, (2018), 5 pages.
Agostini, Marco et al., "Characteristics of Li2S8-Tetraglyme Catholyte in a Semi-Liquid Lithium-Sulfur Battery," Elsevier, (2014), 6 pages.
Hendrickson, Kenville E. et al., "Model Membrane-Free Li—S Batteries for Enhanced Performance and Cycle Life," Advanced Science, (2015), 2, 9 pages.
Mosavati, Negar et al., "Nanostructured Titanium Nitride as a Novel Cathode for High Performance Lithium/Dissolved Polysulfide Batteries," Elsevier, (2016), 7 pages.
Mosavati, Negar et al., "Characterization and Electrochemical Activities of Nanostructured Transition Metal Nitrides as Cathode Materials for Lithium Sulfur Batteries," Elsevier, (2016), 7 pages.
Salem, Hesham Al et al., "Electrocatalytic Polysulfide Traps for Controlling Redox Shuttle Process of Li—S Batteries," Journal of the American Chemical Society, (2015), 137, 4 pages.
Pan, Jin et al., "Enhanced Electrochemical Performance of Sulfur Cathodes With a Water-Soluble Binder," Royal Society of Chemistry, (2015), 5, 6 pages.
Gogotsi, Y. et al., "True Performance Metrics in Electrochemical Energy Storage," Science Magazine, vol. 334, Nov. 18, 2011, 4 pages.
Peng, Hong-Jie et al., "Review on High-Loading and High-Energy Lithium-Sulfur Batteries," Advanced Energy Materials, (2017), 54 pages.
Cheon, Sang-Eun et al., "Rechargeable Lithium Sulfur Battery," Journal of the Electrochemical Society, 150, (2003), 6 pages.
Barai, Pallab et al., "Poromechanical Effect in the Lithium-Sulfur Battery Cathode," Elxevier Ltd., (2016) 12 pages.
Youn, Hee-Chang et al., "High-Surface-Area Nitrogen-Doped Reduced Graphene Oxide for Electric Double-Layer Capacitors," ChemSusChem, (2015) 8, 10 pages.
Ossonon, Benjamin Diby et al., "Synthesis and Characterization of Sulfophenyl-functionalized Reduced Graphene Oxide Sheets," Royal Society of Chemistry, (2017) 7, 11 pages.
Mistry, Aashutosh et al., "Precipitation—Microstructure Interactions in the Li-Sulfur Battery Electrode," The Journal of Physical Chemistry, (2017) 121, 9 pages.
Wu, Huali et al., "A High-Efficiency N/P Co-Doped Graphene/ CNT@Porous Carbon Hybrid Matrix As A Cathode Host For High Performance Lithium-Sulfur Batteries," Journal of Materials Chemistry A, (2017) 5, 15 pages.
Deng, Wei et al., "Graphene/Sulfur Composites with a Foam-Like Porous Architecture and Controllable Pore Size for High Performance Lithium-Sulfur Batteries," ChemNanoMat, Aug. 2016, 10 pages.
Gao, Feng et al., "Graphene/Carbon Nanotubes Composite as a Polysulfide Trap for Lithium-Sulfur Batteries," International Journal of Electrochemical Science, 14 (2019) 3301-3314.

(56) References Cited

OTHER PUBLICATIONS

International Preliminary Report on Patentability for PCT International Application No. PCT/SG2020/050319, issued Dec. 14, 2021, 9 pages.
International Search Report for PCT International Application No. PCT/SG2020/050319, mailed Sep. 15, 2020, 4 pages.
Song, Ji-Yoon et al., "A Polysulfide-Infiltrated Carbon Cloth Cathode for High-Performance Flexible Lithium-Sulfur Batteries," nanomaterials, Feb. 7, 2018, 10 pages.
Written Opinion of the International Searching Authority for PCT International Application No. PCT/SG2020/050319, mailed Sep. 15, 2020, 8 pages.
Zhang, Yongguang et al., A porous 3D-RGO@MWCNT hybrid material as Li—S battery cathode, Beilstein Journal of NanoTechnology, Feb. 21, 2019, 8 pages.
Cheong, Jian Liang et al., "A high-performance slurry-coated polysulfide cathode for lithium-sulfur battery," Nano Energy, Sep. 14, 2019, vol. 66, 9 pages, 104114.

* cited by examiner

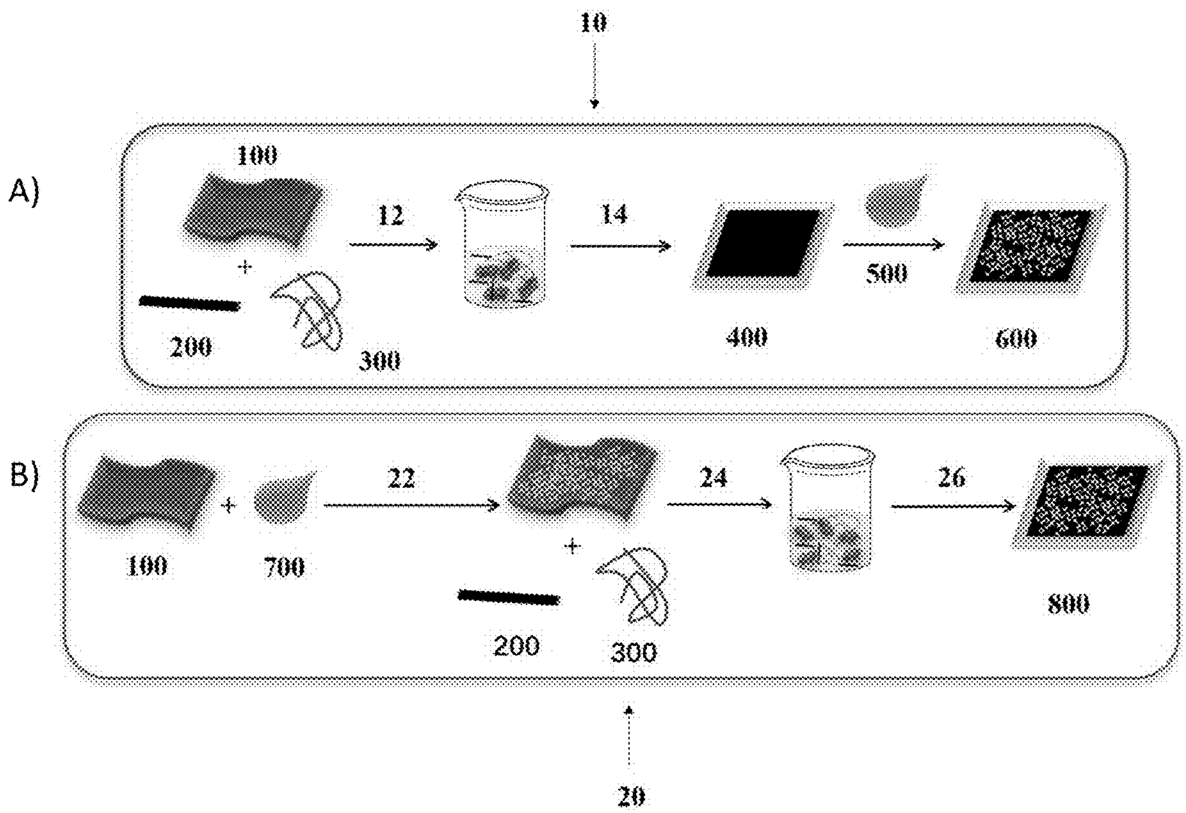
[Figure 1]

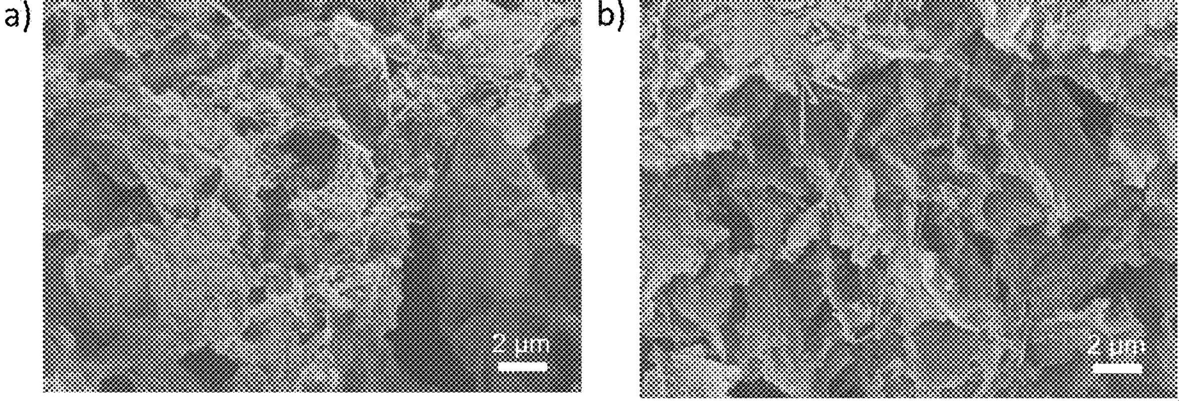
[Figure 2]

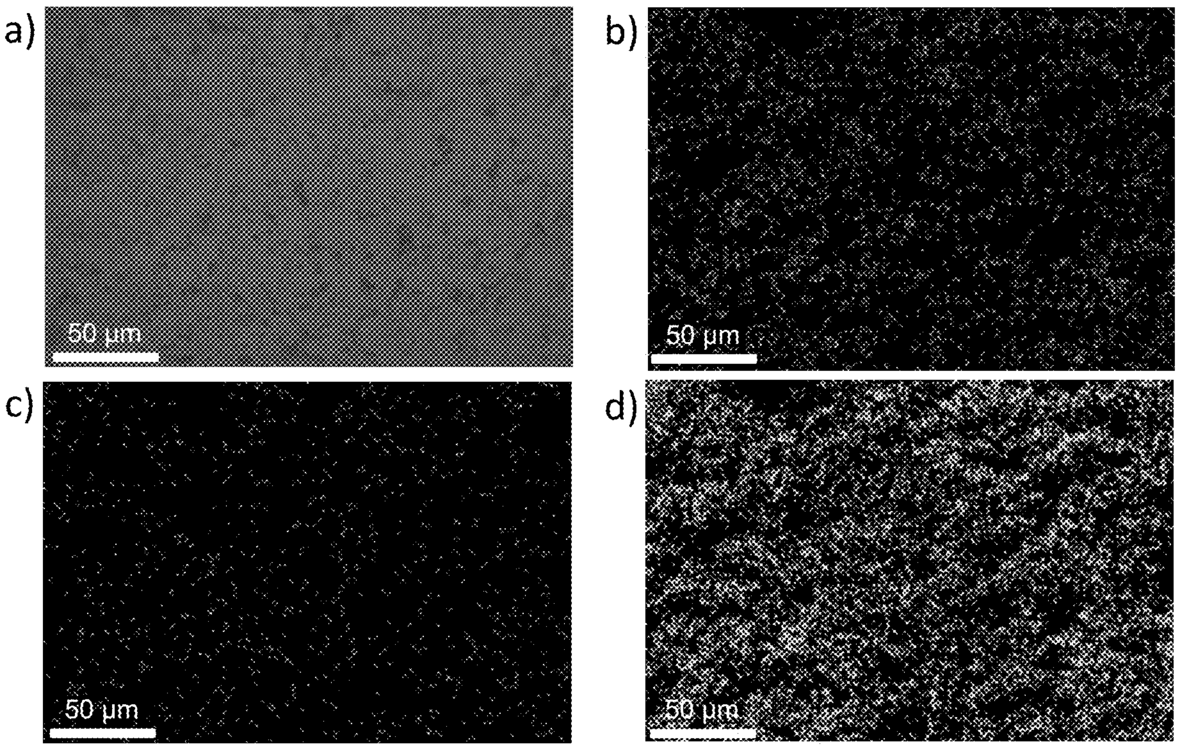
[Figure 3]

a)
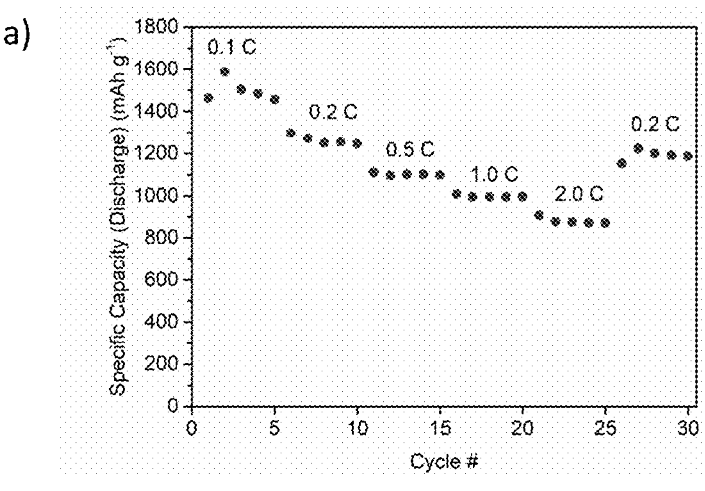
b)
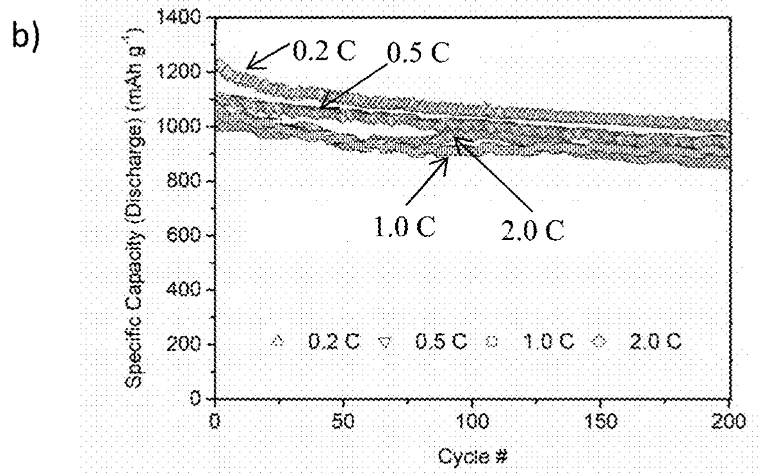
c)
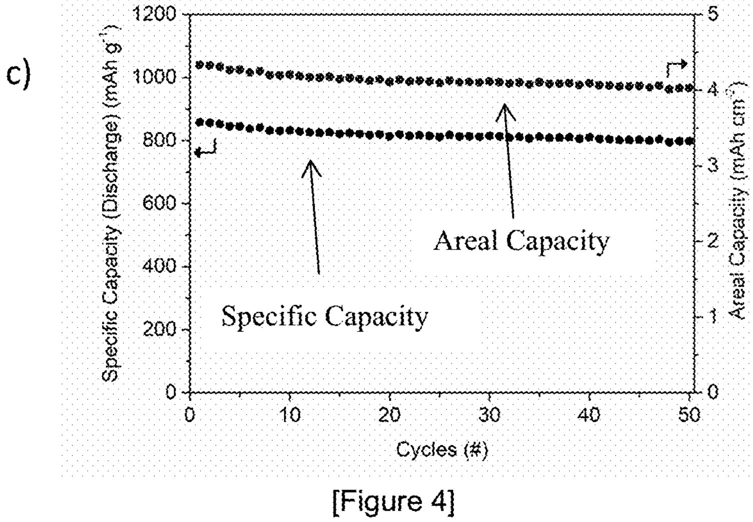
[Figure 4]

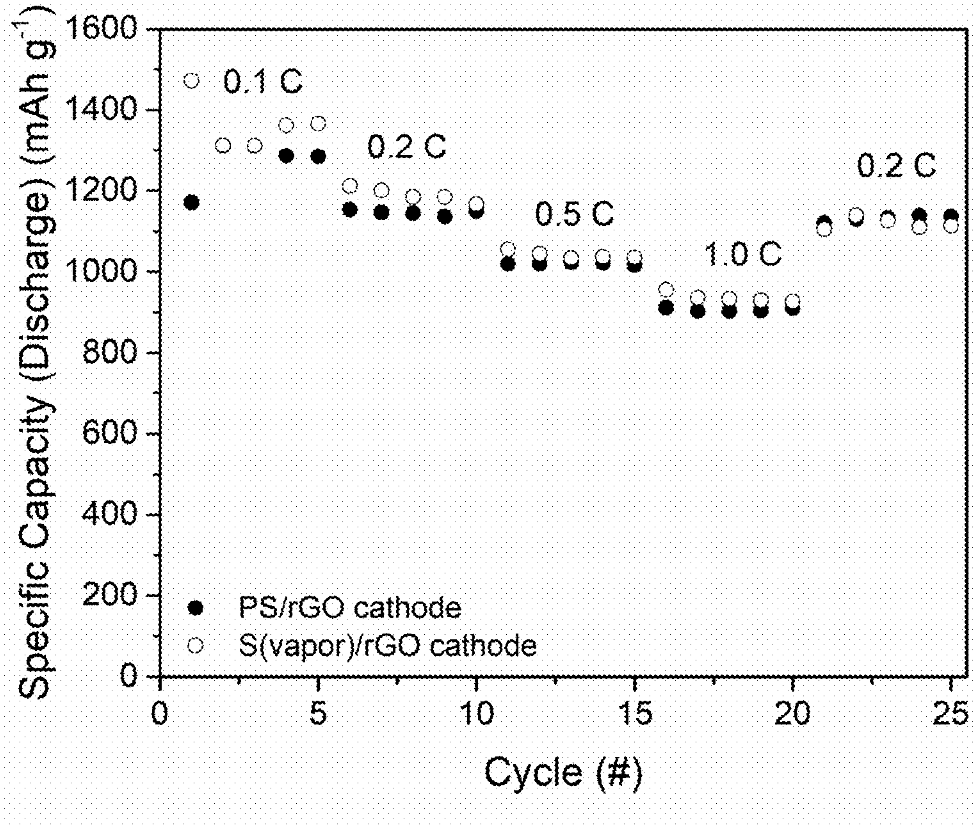
[Figure 5]

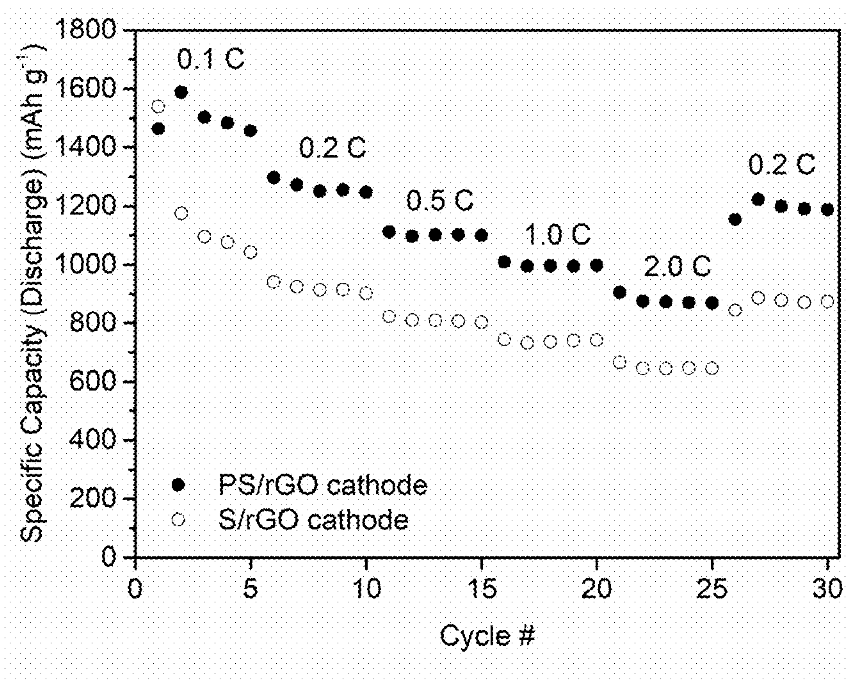
[Figure 6]

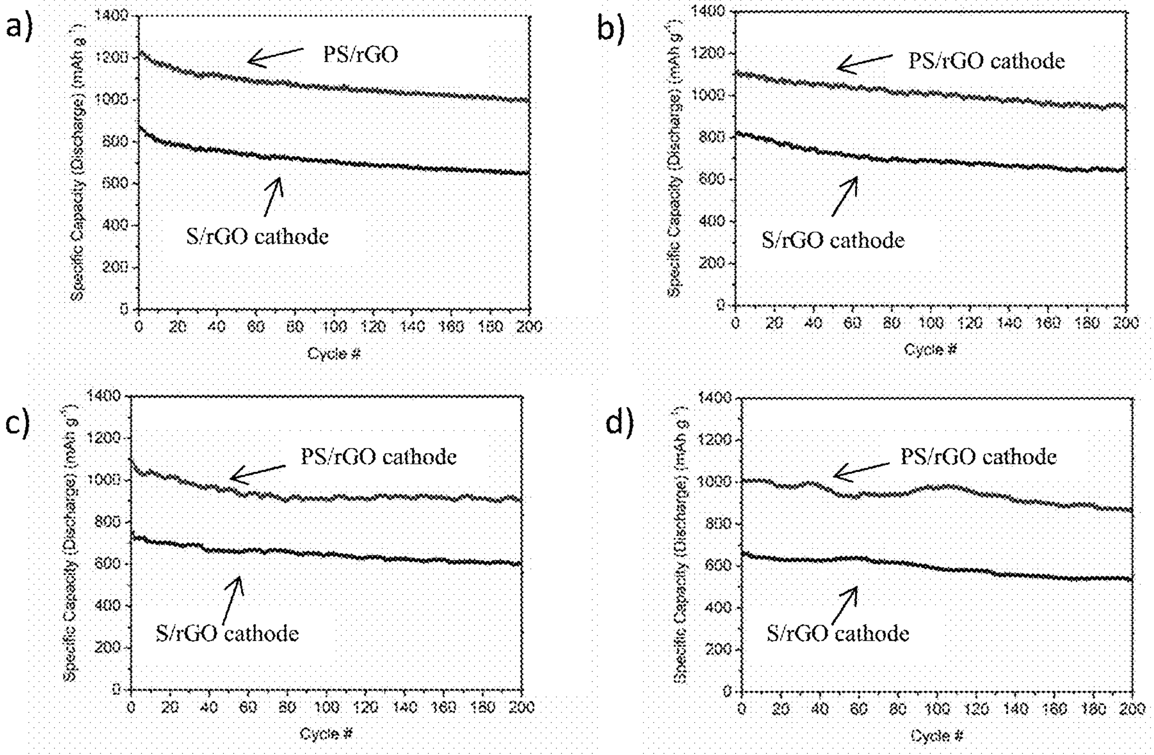
[Figure 7]

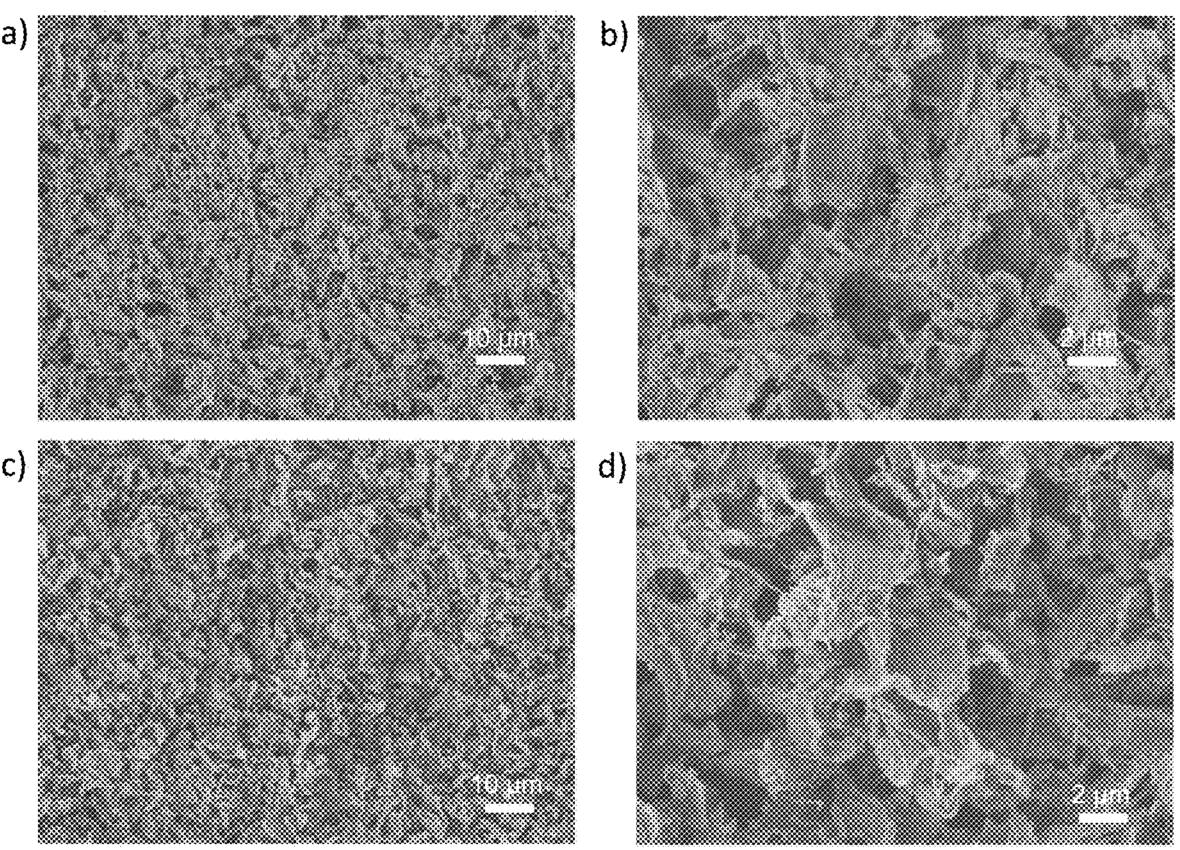
[Figure 8]

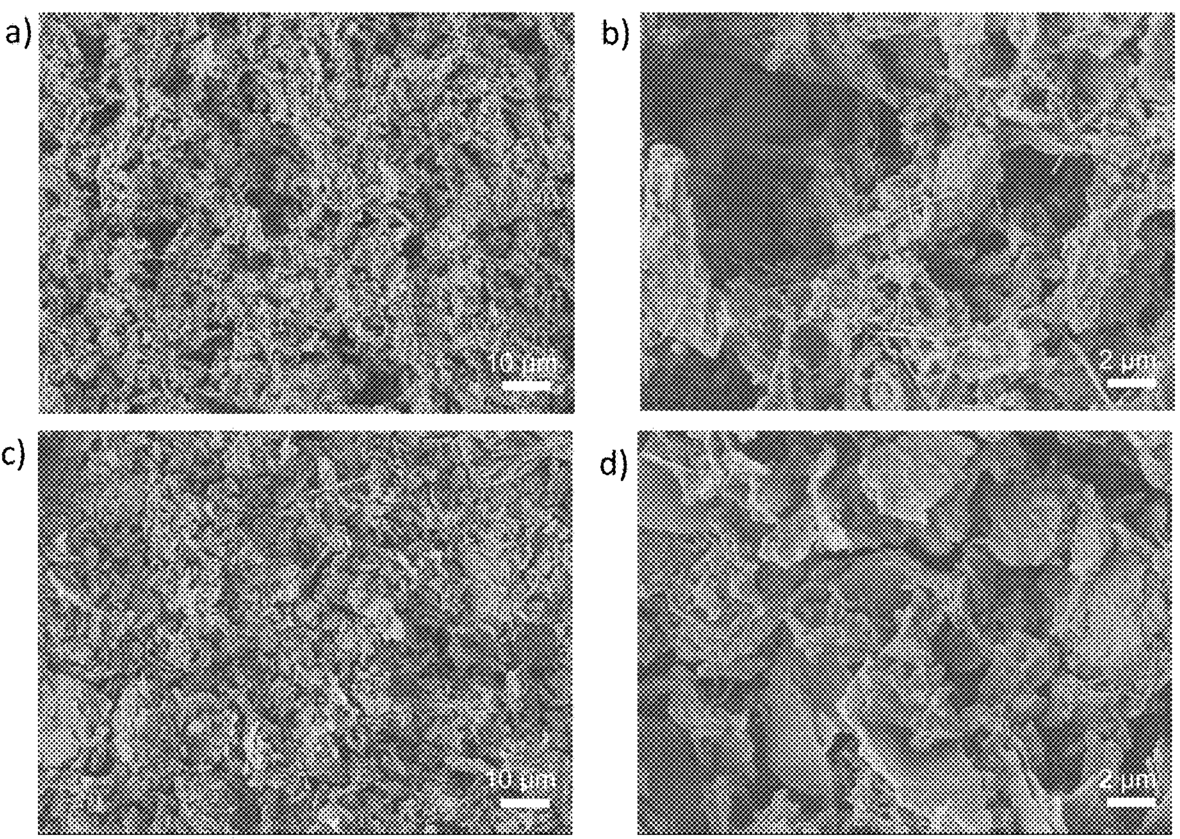
[Figure 9]

a)
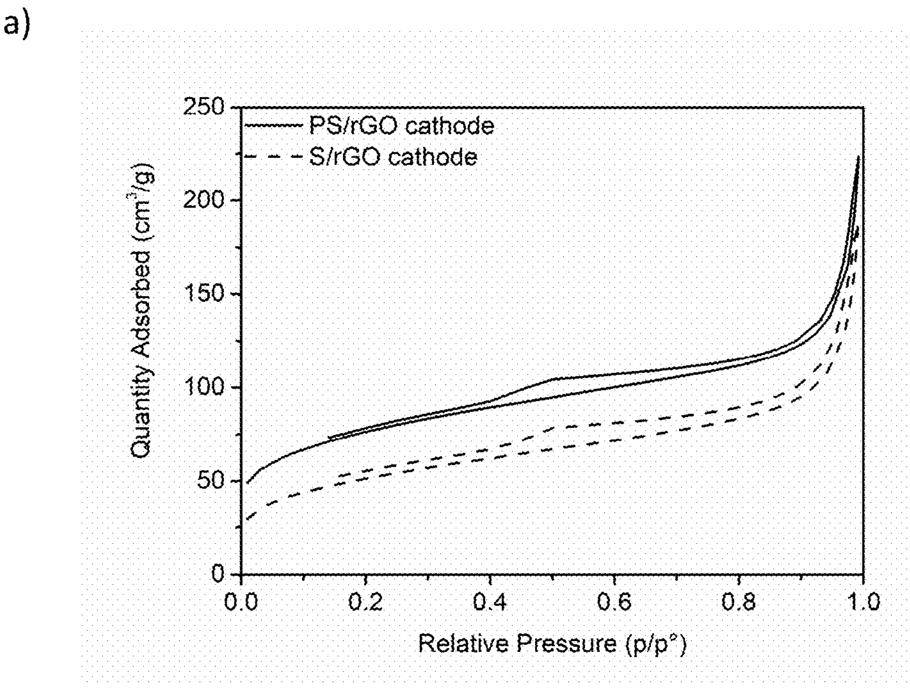
b)
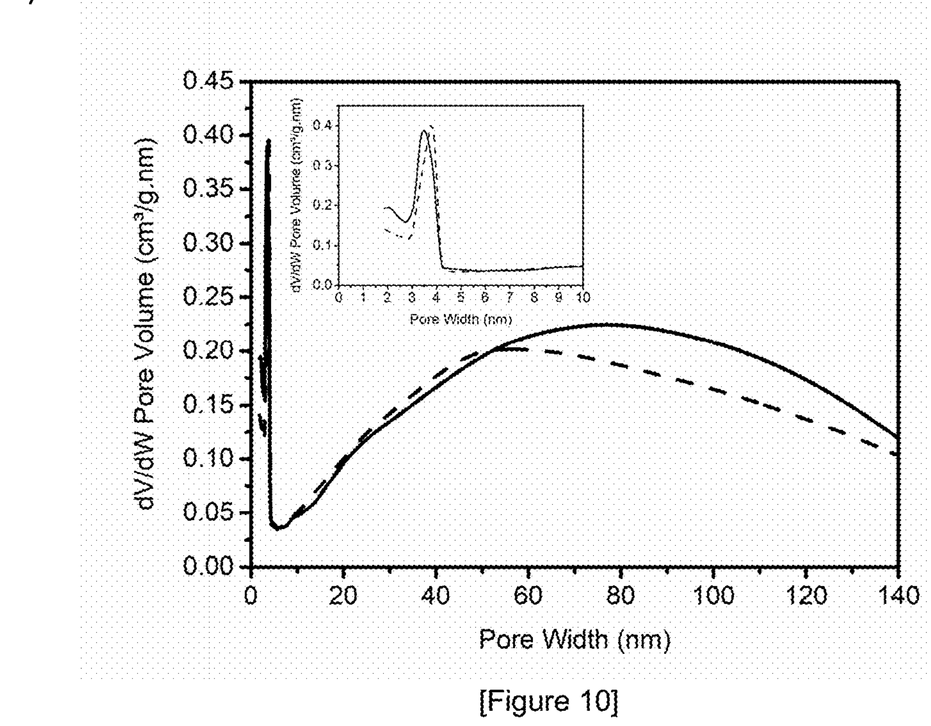
[Figure 10]

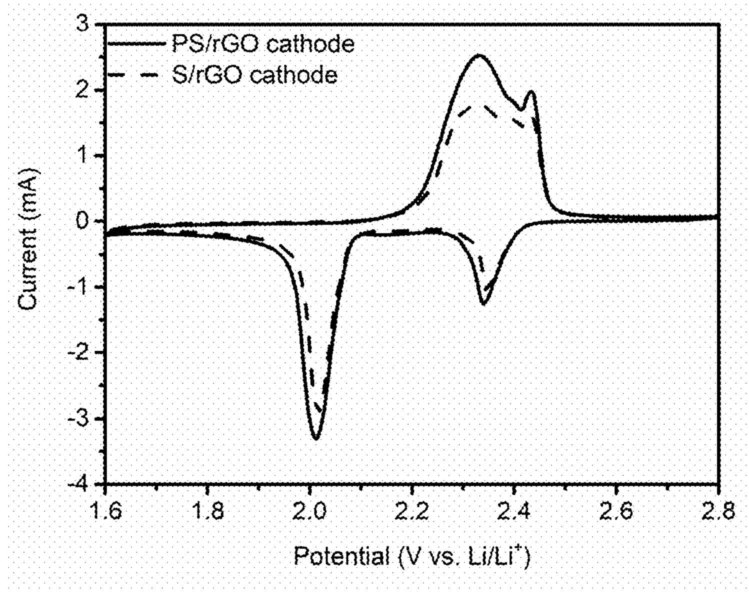
[Figure 11]

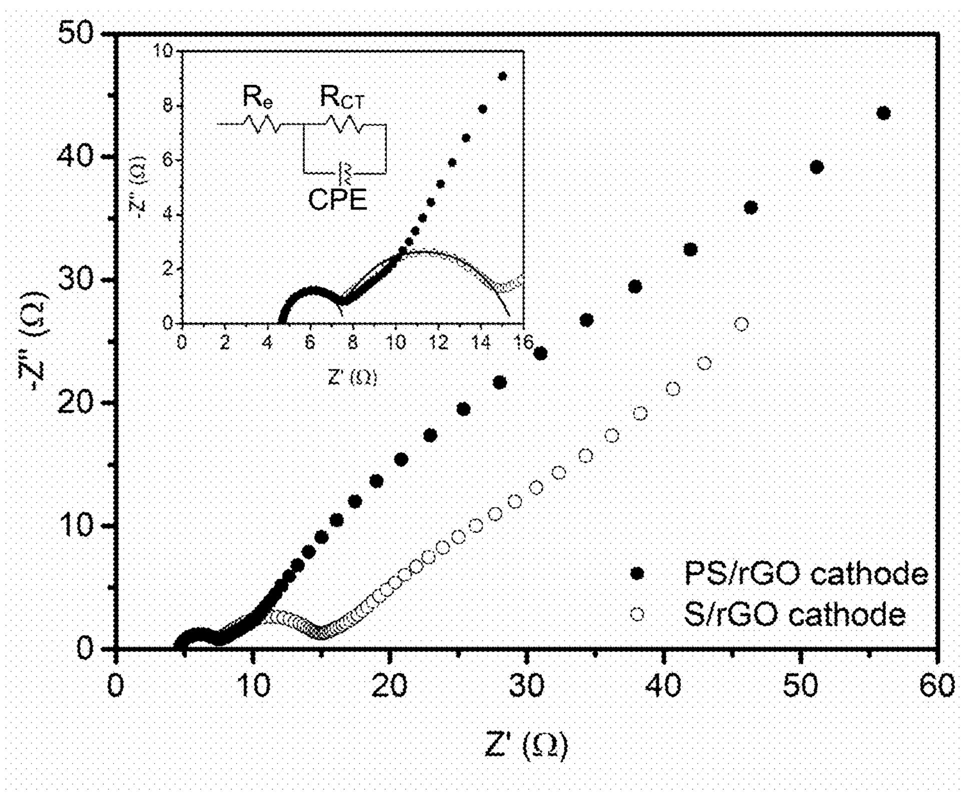
[Figure 12]

CATHODE MATERIAL AND A METHOD OF PREPARING THE SAME

REFERENCES TO RELATED APPLICATIONS

This application claims priority to Singapore application number 10201905403Y filed on 13 Jun. 2019, the disclosure of which is hereby incorporated by reference.

TECHNICAL FIELD

The present invention relates to a cathode material, a method of preparing the same, an electrochemical cell and a lithium-sulfur battery.

BACKGROUND ART

The high theoretical energy density, low material cost and high abundance of sulfur makes lithium-sulfur (Li—S) battery system very attractive for energy storage. Although already in the market for niche applications, full-scale commercialization of Li—S batteries will not be realized until certain challenges are overcome. These problems are largely related to the cathode: low active material utilization due to low electronic conductivity of sulfur and $Li_2S$, collapse of cathode structure from the constant volume changes during cycling, and polysulfide (PS) shuttling effect leading to poor cycling stability. Unlike lithium ion battery (LIB), the Li—S battery has an intricate electrochemistry. It begins with the dissolution of elemental sulfur into PS, which can be long-chain $S_8^{2-}$ and $S_6^{2-}$ and/or shorter-chain $S_4^{2-}$ and $S_2^{2-}$, depending on the state of discharge. The dissolution process results in the loss of contact between the binder and cathode materials that ultimately leads to structural collapse.

Since sulfur dissolution to PS is inevitable, PS has been considered to be used as a sulfur source for Li—S batteries or the cathode structure and the way of sulfur loading may be modified to increase sulfur loading and to address the PS shutting effect. In fact, it has been shown that the use of PS in place of solid sulfur as cathode material offers several advantages, such as improved sulfur utilization and enhanced redox kinetics. Earlier work on Li—PS batteries established that PS cathodes have reduced polarization, high ionic conductivity and high capacity retention, as compared to solid sulfur cathodes. However, the electrochemical performance of slurry-coated PS electrodes such as Pt/graphene, Super P® carbon black, silica-etch carbon, metal nitrides and hierarchical porous carbon, is not satisfactory. These materials have either low electronic conductivity (Super P® carbon blackand silica-etch carbon) or small surface area (Super P® carbon black and metal nitride nanoparticles). Although the Pt/graphene material is expected to work well, its cathode microstructure appear less porous and too dense. Thus, PS interaction with active Pt/graphene surface would not be optimal for electrochemical performance.

Subsequent research efforts have been shifted towards the use of PS on free-standing cathode structures. Although these cathodes were reported to have excellent electrochemical performance, it might be costly to prepare free-standing structures at an industrial scale, as compared to the slurry-coating process for current collectors for Li-ion batteries. Notably, free-standing PS cathodes have exceptional performance, but its preparation is not scalable as compared to the slurry-coating process.

Therefore, there is a need to provide a cathode material, a method of preparing the same, an electrochemical cell and a lithium-sulfur battery that overcome or ameliorate one or more of the disadvantages mentioned above.

SUMMARY

In one aspect, the present disclosure relates to a cathode material comprising a layer of sulfur species dispersed within or thereon a porous matrix comprising a first conducting carbon material, a second conducting carbon material and a binder, wherein the second conducting carbon material is carbon fiber or carbon nanotube.

In another aspect, the present disclosure relates to a cathode material comprising a layer of sulfur species dispersed within or thereon a porous matrix comprising a first conducting carbon material, a second conducting carbon material and a binder, wherein said porous matrix is interconnected with uniform pores.

Advantageously, due to the way the cathode material is made, the cathode material may be interconnected with pores that are uniform in size and volume, large surface area and/or small ohmic resistance. The cathode material as described herein can be used in a lithium-sulfur battery and due to the large surface area, availability of electrochemically active sites for sulfur species, such as sulfur (S), lithium sulfide ($Li_2S$) and polysulfide (PS), can be increased, allowing both nucleation and binding to occur on the cathode surface, leading to higher specific capacities of the cathode material.

Further advantageously, the large surface area of the cathode material as described herein may lead to a decrease in the concentration of dissolved PS in bulk, reducing the undesired PS shuttling effect. Therefore, the capacity fading of the capacity fading of the electrode material may be inhibited.

In another aspect, the present disclosure relates to a method for preparing a cathode material comprising the steps of:

a) coating a support with a slurry formed by mixing a mixture of a first conducting carbon material, a second conducting carbon material and a binder, wherein the second conducting carbon material is carbon fiber or carbon nanotube; and
b) adding a sulfur source in fluid state to the coated support to thereby obtain the cathode material.

In another aspect, the present disclosure relates to a method for preparing a cathode material comprising the steps of:

a) coating a support with a slurry formed by mixing a mixture of a first conducting carbon material, a second conducting carbon material and a binder;
b) adding a sulfur source in fluid state to the coated support to thereby obtain the cathode material.

Advantageously, by forming the coated support first and then adding the sulfur species onto the coated support, this results in the final cathode material that is interconnected with pores that are of uniform size and volume. The final cathode material may also have a large surface area as well as a smaller ohmic resistance. Therefore, the steps in the method have to be in this order whereby the cathode material is preformed, followed by dispersion of the sulfur source therein or thereon. This is in comparison to melt-diffusion methods in which the sulfur source is added to the support first, followed by the cathode material and the binder. Using melt-diffusion results in a cathode with inconsistent pore sizes.

Advantageously, the method as described herein by slurry coating may utilize inexpensive commercially available materials to develop high-performance lithium-PS batteries with large-surface-area cathodes as compared to conventional melt-diffusion method.

Further advantageously, the method as described herein is industrially scalable and environmentally friendly. In view that the cathode preparation method has a strong influence on the electrochemical performance, different cathode preparation approaches should be considered for future designs of practical lithium-sulfur batteries.

In another aspect, the present disclosure relates to a cathode material prepared by the method as described herein.

In another aspect, the present disclosure relates to an electrochemical cell comprising a cathode material as described herein and a liquid electrolyte.

In another aspect, the present disclosure relates to a lithium-sulfur battery comprising one or more electrochemical cells as described herein.

Advantageously, for the lithium-sulfur battery as described herein, high specific capacities between 1220 mAh $g^{-1}$ and 1007 mAh $g^{-1}$ can be achieved at charge rates of 0.2-2.0 C, with low capacity fade of lower than 0.14% per cycle over 200 cycles. At higher sulfur loading, a practical areal capacity of >4 mAh $g^{-1}$ can also be achieved. Remarkably, the cathode material as described herein may offer 48% higher specific capacity and 26% lower capacity fade than the sulfur cathode prepared by the conventional melt-diffused method due to differences in morphology, surface area and ohmic resistance of the cathodes.

DEFINITIONS

The following words and terms used herein shall have the meaning indicated:

The term "interconnected" or "interconnectivity" as used here represents the characteristics of the cathode material that maintains unimpeded electronic pathways from current collector throughout the entire cathode structure during the charging and/or discharging operation of the sulfur-lithium battery, and therefore achieves good conductivity and low ohmic resistance of the cathode material.

The term "polysulfide" as used herein represents a class of chemical compounds comprising chains of sulfur atoms. The chain of sulfur atoms may have the general formal $S_n^{2-}$ and may be a conjugate base to form a compound with metal ions, such as lithium or sodium.

The term "graphene" as used herein represents a two-dimensional allotrope of carbon in the form of a single layer of atoms with the carbon atoms arranged in a two-dimensional honeycomb lattice.

The term "reduced graphene oxide" is one form of graphene oxide that is processed by chemical, thermal and other methods in order to reduce the oxygen content.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a cathode material will now be disclosed.

The present disclosure relates to a cathode material comprising a layer of sulfur species dispersed within or thereon a porous matrix comprising a first conducting carbon material, a second conducting carbon material and a binder, wherein the second conducting carbon material is carbon fiber or carbon nanotube.

The present disclosure relates to a cathode material comprising a layer of sulfur species dispersed within or thereon a porous matrix comprising a first conducting carbon material, a second conducting carbon material and a binder, wherein said porous matrix is interconnected with uniform pores.

The sulfur species may be a polysulfide or elemental sulfur.

The layer of sulfur species may be a continuous layer of sulfur particles. The layer of sulfur species may be polysulfide molecules. The polysulfide molecules may be adsorbed onto the porous matrix through electrostatic or polar-polar interactions.

The polysulfide may have a formula of $Li_2S_n$, wherein $2<n\leq8$. The polysulfide may be selected from $Li_2S_2$, $Li_2S_4$, $Li_2S_6$, $Li_2S_8$ or their mixtures thereof. The polysulfide may preferably be $Li_2S_6$.

The cathode material may have a sulfur content in the range of about 30 wt % to about 80 wt %, about 35 wt % to about 80 wt %, about 40 wt % to about 80 wt %, about 45 wt % to about 80 wt %, about 50 wt % to about 80 wt %, about 55 wt % to about 80 wt %, about 60 wt % to about 80 wt %, about 65 wt % to about 80 wt %, about 70 wt % to about 80 wt %, about 75 wt % to about 80 wt %, about 30 wt % to about 75 wt %, about 30 wt % to about 70 wt %, about 30 wt % to about 65 wt %, about 30 wt % to about 60 wt %, about 30 wt % to about 55 wt %, about 30 wt % to about 50 wt %, about 30 wt % to about 45 wt %, about 30 wt % to about 40 wt % or about 30 wt % to about 35 wt % based on the total weight of the cathode material.

The first conducting carbon material may be selected from the group consisting of reduced graphene oxide, graphene, graphite, carbon nanotube, carbon fiber, acetylene black, and ketjenblack. The first conducting carbon material may be different from the second conducting carbon material. Specifically, where the second conducting material is carbon nanotube, the first conducting material is not carbon nanotube. Specifically, where the second conducting material is carbon fiber, the first conducting material is not carbon fiber. The first conducting carbon material may be reduced graphene oxide (rGO).

The first conducting carbon material may be doped with nitrogen, oxygen, sulfur, boron, phosphorus or their mixtures thereof. Advantageously reduced graphene oxide (rGO) doped with nitrogen is highly conductive. The sites of doped nitrogen, oxygen, sulfur, boron, phosphorus or their mixtures thereof have high affinity for polysulfide absorption to mitigate polysulfide shuttling.

The amount of the first conducting material may be in the range of about 20 wt % to about 60 wt %, about 25 wt % to about 60 wt %, about 30 wt % to about 60 wt %, about 35 wt % to about 60 wt %, about 40 wt % to about 60 wt %, about 45 wt % to about 60 wt %, about 50 wt % to about 60 wt %, about 55 wt % to about 60 wt %, about 20 wt % to about 55 wt %, about 20 wt % to about 50 wt %, about 20 wt % to about 45 wt %, about 20 wt % to about 40 wt %, about 20 wt % to about 35 wt %, about 20 wt % to about 30 wt % or about 20 wt % to about 25 wt % based on the total weight of the cathode material.

The binder may be a copolymer of acrylamide, lithium carboxylate and cyano group, polyvinylidene fluoride (PVDF), styrene/butadiene copolymer (SBR), carboxylmethyl cellulose (CMC), polysaccharides, or a polymer having a monomer selected from the group consisting of olefin, butadiene, carboxylate, carboxylate salt of Li and Na, styrene, amide, ester, acrylate, methacrylate, urethane and mixtures thereof. The binder may preferably be a copolymer of acrylamide, lithium carboxylate and cyano group, an example of which is LA-132 from Chengdu Indigo Power Sources Co. Ltd. (China).

The binder may be water soluble. Advantageously, the binder may be water-soluble LA-132 binder, which is non-toxic as compared to the conventional PVDF/N-methyl-2-pyrrolidone (NMP) binder/solvent system.

The amount of the binder may be in the range of about 5 wt % to about 15 wt %, about 6.5 wt % to about 15 wt %, about 8 wt % to about 15 wt %, about 9.5 wt % to about 15 wt %, about 11 wt % to about 15 wt %, about 12.5 wt % to about 15 wt %, about 14 wt % to about 15 wt %, about 5 wt % to about 14 wt %, about 5 wt % to about 12.5 wt %, about 5 wt % to about 11 wt %, about 5 wt % to about 9.5 wt %, about 5 wt % to about 8 wt % or about 5 wt % to about 6.5 wt % based on the total weight of the cathode material.

The first conducting carbon material and the second conducting carbon material are placed or supported on a support. Having a binder in the slurry and therefore in the resultant cathode results in the cathode being bound together, where the binding occurs between the polysulfide, the first conducting carbon material and the second conducting carbon material and/or between the first conducting carbon material, the second conducting carbon material and the support. This differentiates the cathode material from the 'free-standing' cathode material of the prior art. Functional groups on the binder may impart polysulfide trapping properties and also enhance ionic conduction.

Advantageously, the carbon fiber material may impart mechanical strength to the cathode structure.

The second conducting carbon material may have a diameter in the range of about 0.1 nm to about 100 μm, about 1 nm to about 100 μm, about 10 nm to about 100 μm, about 100 nm to about 100 μm, about 1 μm to about 100 μm, about 10 μm to about 100 μm, about 0.1 nm to about 10 μm, about 0.1 nm to about 1 μm, about 0.1 nm to about 100 nm, about 0.1 nm to about 10 nm, about 0.1 nm to about 1 nm.

The carbon fiber material may be vapor grown carbon fiber (VGCF). The second conducting carbon material may be functionalized with functional groups to further impart polysulfide trapping properties and enhance ionic conduction. Non-limiting examples of such functional groups are —OH, —COOH, $—NH_2$, —SH or $—SO_2H$.

The amount of the second conducting carbon material may be in the range of about 5 wt % to about 35 wt %, about 10 wt % to about 35 wt %, about 15 wt % to about 35 wt %, about 20 wt % to about 35 wt %, about 25 wt % to about 35 wt %, about 30 wt % to about 35 wt %, about 5 wt % to about 30 wt %, about 5 wt % to about 25 wt %, about 5 wt % to about 20 wt %, about 5 wt % to about 15 wt % or about 5 wt % to about 10 wt % based on the total weight of the cathode material.

Advantageously, the first conducting carbon material, the binder and the second conducting carbon material may be inexpensive and commercially available material that are easy to be produced on an economical scale.

The cathode material as described herein may have a sulfur loading density in the range of about 1.3 mg $cm^{-2}$ to about 15 mg $cm^{-2}$, about 1.5 mg $cm^{-2}$ to about 15 mg $cm^{-2}$, about 2 mg $cm^{-2}$ to about 15 mg $cm^{-2}$, about 2.5 mg $cm^{-2}$ to about 15 mg $cm^{-2}$, about 3 mg $cm^{-2}$ to about 15 mg $cm^{-2}$, about 5 mg $cm^{-2}$ to about 15 mg $cm^{-2}$, about 7 mg $cm^{-2}$ to about 15 mg $cm^{-2}$, about 9 mg $cm^{-2}$ to about 15 mg $cm^{-2}$, about 11 mg $cm^{-2}$ to about 15 mg $cm^{-2}$, about 13 mg $cm^{-2}$ to about 15 mg $cm^{-2}$, about 1.3 mg $cm^{-2}$ to about 13 mg $cm^{-2}$, about 1.3 mg $cm^{-2}$ to about 11 mg $cm^{-2}$, about 1.3 mg $cm^{-2}$ to about 9 mg $cm^{-2}$, about 1.3 mg $cm^{-2}$ to about 7 mg $cm^{-2}$, about 1.3 mg $cm^{-2}$ to about 5 mg $cm^{-2}$, about 1.3 mg $cm^{-2}$ to about 3 mg $cm^{-2}$, about 1.3 mg $cm^{-2}$ to about 2.5 mg $cm^{-2}$, about 1.3 mg $cm^{-2}$ to about 2 mg $cm^{-2}$ or about 1.3 mg $cm^{-2}$ to about 1.5 mg $cm^{-2}$.

The cathode material may have a charge transfer resistance in the range of about 2Ω to about 50Ω, about 5Ω to about 50Ω, about 10Ω to about 50Ω, about 15Ω to about 50Ω, about 20Ω to about 50Ω, about 25Ω to about 50Ω, about 30Ω to about 50Ω, about 35Ω to about 50Ω, about 40Ω to about 50Ω, about 45Ω to about 50Ω, about 2Ω to about 45Ω, about 2Ω to about 40Ω, about 2Ω to about 35Ω, about 2Ω to about 30Ω, about 2Ω to about 25Ω, about 2Ω to about 20Ω, about 2Ω to about 15Ω, about 2Ω to about 10Ω, about 2Ω to about 5Ω as characterized by electrochemical impedance spectroscopy (EIS). Advantageously, the low Ohmic resistance of the cathode improves sulfur utilization of the cathode in the lithium sulfur battery and therefore increases specific capacity of the battery.

The cathode material as described herein may have a surface area in the range of about 200 $m^2/g$ to about 900 $m^2/g$, about 250 $m^2/g$ to about 900 $m^2/g$, about 300 $m^2/g$ to about 900 $m^2/g$, about 350 $m^2/g$ to about 900 $m^2/g$, about 400 $m^2/g$ to about 900 $m^2/g$, about 450 $m^2/g$ to about 900 $m^2/g$, about 500 $m^2/g$ to about 900 $m^2/g$, about 550 $m^2/g$ to about 900 $m^2/g$, about 600 $m^2/g$ to about 900 $m^2/g$, about 650 $m^2/g$ to about 900 $m^2/g$, about 700 $m^2/g$ to about 900 $m^2/g$, about 750 $m^2/g$ to about 900 $m^2/g$, about 800 $m^2/g$ to about 900 $m^2/g$, about 850 $m^2/g$ to about 900 $m^2/g$, about 200 $m^2/g$ to about 850 $m^2/g$, about 200 $m^2/g$ to about 800 $m^2/g$, about 200 $m^2/g$ to about 750 $m^2/g$, about 200 $m^2/g$ to about 700 $m^2/g$, about 200 $m^2/g$ to about 650 $m^2/g$, about 200 $m^2/g$ to about 600 $m^2/g$, about 200 $m^2/g$ to about 550 $m^2/g$, about 200 $m^2/g$ to about 500 $m^2/g$, about 200 $m^2/g$ to about 450 $m^2/g$, about 200 $m^2/g$ to about 400 $m^2/g$, about 200 $m^2/g$ to about 350 $m^2/g$, about 200 $m^2/g$ to about 300 $m^2/g$ or about 200 $m^2/g$ to about 250 $m^2/g$.

The cathode material as described herein may have a pore volume in the range of about 0.25 $cm^3/g$ to about 3 $cm^3/g$, about 0.5 $cm^3/g$ to about 3 $cm^3/g$, about 1 $cm^3/g$ to about 3 $cm^3/g$, about 1.5 $cm^3/g$ to about 3 $cm^3/g$, about 2 $cm^3/g$ to about 3 $cm^3/g$, about 2.5 $cm^3/g$ to about 3 $cm^3/g$, about 0.25 $cm^3/g$ to about 2.5 $cm^3/g$, about 0.25 $cm^3/g$ to about 2 $cm^3/g$, about 0.25 $cm^3/g$ to about 1.5 $cm^3/g$, about 0.25 $cm^3/g$ to about 1 $cm^3/g$ or about 0.25 $cm^3/g$ to about 0.5 $cm^3/g$.

The cathode material as described herein may have a pore size distribution of mesopore size in the range of about 2 nm to about 50 nm and macropore size more than 50 nm The mesopore size may be in the range of about 2 nm to about 50 nm, about 5 nm to about 50 nm, about 10 nm to about 50 nm, about 15 nm to about 50 nm, about 20 nm to about 50 nm, about 25 nm to about 50 nm, about 30 nm to about 50 nm, about 35 nm to about 50 nm, about 40 nm to about 50 nm, about 45 nm to about 50 nm, about 2 nm to about 45 nm, about 2 nm to about 40 nm, about 2 nm to about 35 nm, about 2 nm to about 30 nm, about 2 nm to about 25 nm, about 2 nm to about 20 nm, about 2 nm to about 15 nm, about 2 nm to about 10 nm or about 2 nm to about 5 nm.

Advantageously, the porous matrix of the cathode material is interconnected with uniform pores as compared to the structure of conventional cathode materials. Pore uniformity and cathode interconnectivity may impart mechanical and electrical stability of the electrode, which contribute to the high retention capability of the lithium-sulfur battery. The interconnected structure allows unimpeded electronic pathways from current collector throughout the entire structure. The uniformity and interconnectivity also contribute to the high surface area and low ohmic resistance of the cathode, which are crucial factors to achieve high specific capacities of the lithium-sulfur battery.

The cathode material, whereby the porous matrix contains carbon fiber or carbon nanotube as the second conducting carbon material, can be regarded as being interconnected with uniform pores.

Exemplary, non-limiting embodiments of a method for preparing a cathode material will now be disclosed.

The present disclosure relates to a method for preparing a cathode material comprising the steps of:

a) coating a support with a slurry formed by mixing a mixture of a first conducting carbon material, a second conducting carbon material and a binder, wherein the second conducting carbon material is carbon fiber or carbon nanotube; and
b) adding a sulfur source in fluid state to the coated support to thereby obtain the cathode material The present disclosure relates to a method for preparing a cathode material comprising the steps of:

a) coating a support with a slurry formed by mixing a mixture of a first conducting carbon material, a second conducting carbon material and a binder; and
b) adding a sulfur source in fluid state to the coated support to thereby obtain the cathode material.

Advantageously, the second conducting carbon material may improve the mechanical strength and interconnectivity of the coated support formed.

The method may further comprise, before said coating step (a), the step of (a1) stirring said mixture in a solvent overnight with a solid content in the range of 3 wt % to 10 wt %.

The solvent may be water or water mixture with polar organic solvents. Non-limiting examples of the polar organic solvents may be ethanol, isopropyl alcohol, butanol, N-methyl-2-pyrrolidone or their mixtures thereof.

The first conducting material may have a concentration in the range of about 60 wt % to about 90 wt %, about 65 wt % to about 90 wt %, about 70 wt % to about 90 wt %, about 75 wt % to about 90 wt %, about 80 wt % to about 90 wt %, about 85 wt % to about 90 wt %, about 60 wt % to about 85 wt %, about 60 wt % to about 80 wt %, about 60 wt % to about 75 wt %, about 60 wt % to about 70 wt % or about 60 wt % to about 65 wt % based on the total weight of solid content in the slurry.

The first conducting carbon material may be selected from the group consisting of reduced graphene oxide, graphene, graphite, carbon nanotube, carbon fiber, acetylene black, and ketjenblack. The first conducting carbon material may be different from the second conducting carbon material. Specifically, where the second conducting material is carbon nanotube, the first conducting material is not carbon nanotube. Specifically, where the second conducting material is carbon fiber, the first conducting material is not carbon fiber. The first conducting carbon material may be reduced graphene oxide (rGO).

The second conducting carbon material may have a concentration in the range of about 5 wt % to about 50 wt %, about 10 wt % to about 50 wt %, about 15 wt % to about 50 wt %, about 20 wt % to about 50 wt %, about 25 wt % to about 50 wt %, about 30 wt % to about 50 wt %, about 35 wt % to about 50 wt %, about 40 wt % to about 50 wt %, about 45 wt % to about 50 wt %, about 5 wt % to about 45 wt %, about 5 wt % to about 40 wt %, about 5 wt % to about 35 wt %, about 5 wt % to about 30 wt %, about 5 wt % to about 25 wt %, about 5 wt % to about 20 wt %, about 5 wt % to about 15 wt % or about 5 wt % to about 10 wt % based on the total weight of solid content.

The binder may have a concentration in the range of about 5 wt % to about 20 wt %, about 10 wt % to about 20 wt %, about 15 wt % to about 20 wt %, about 5 wt % to about 15 wt % or about 5 wt % to about 10 wt % based on the total weight of solid content.

The mass ratio of the conducting material versus the carbon fiber material may be in the range of about 1:1 to 10:1. The mass ratio of the carbon fiber material versus the binder may be in the range of 1:2 to 2:1. The mass ratio of the carbon fiber material versus the binder may preferably be 1:1.

The mixture may be applied on the support via the doctor's blade method. A solid mass in the range of about 3 mg to 4 mg may be used to prepare the cathode material as described herein for use in a coin cell. Larger amount of the solid mass is required in proportion if the cathode material is used in a larger lithium-sulfur battery.

The method as described herein may further comprise, after said coating step (a), the step of (a2) drying the coated support at a temperature in the range of about 40° C. to about 80° C., about 50° C. to about 80° C., about 60° C. to about 80° C., about 70° C. to about 80° C., about 40° C. to about 70° C., about 40° C. to about 60° C. or about 40° C. to about 50° C. for more than 2 hours, more than 4 hours, more than 6 hours, more than 8 hours, more than 10 hours, more than 12 hours, more than 14 hours or more than 16 hours or more than 18 hours after coating the support with the slurry. The drying step may preferably in the range of about 60° C. to about 80° C. The drying step may be done overnight.

The method as described herein may comprise the step of preparing a polysulfide (PS) solution as the sulfur source in fluid state by stirring a mixture of sulfur (S) and lithium sulfide ($Li_2S$). The mixture may be stirred at a temperature in the range of about 40° C. to about 60° C. overnight in a glovebox. The glovebox may be filled with an inert gas due to high reactive of lithium and to prevent other unnecessary side reactions. The glovebox may be Argon filled.

The polysulfide may have a formula of $Li_2S_n$, wherein $2<n\leq8$. The polysulfide may be selected from $Li_2S_4$, $Li_2S_6$, $Li_2S_8$ or their mixtures thereof. The polysulfide may preferably be $Li_2S_6$.

The sulfur (S) and the lithium sulfide ($Li_2S$) may be mixed in an electrolyte as solvent. The electrolyte may be an electrolyte known in the art commonly used for a lithium-sulfur battery. The electrolyte may be prepared by adding about 0.5 M to about 3 M LiTFSI, LiOTf, LiFSI or LiBETI and about 0.1 wt % to about 10 wt % $LiNO_3$ to a mixture of 1,3-dioxolane (DOL) and 1,2-dimethoxyethane (DME) (volume ratio in the range of about 3:1 to about 1:3).

The concentration of the sulfur in the mixture may be in the range of about 50 mg/mL to about 200 mg/mL, about 70 mg/mL to about 200 mg/mL, about 80 mg/mL to about 200 mg/mL, about 100 mg/mL to about 200 mg/mL, about 120 mg/mL to about 200 mg/mL, about 140 mg/mL to about 200 mg/mL, about 160 mg/mL to about 200 mg/mL, about 180 mg/mL to about 200 mg/mL, about 50 mg/mL to about 180 mg/mL, about 50 mg/mL to about 160 mg/mL, about 50 mg/mL to about 140 mg/mL, about 50 mg/mL to about 120 mg/mL, about 50 mg/mL to about 100 mg/mL, about 50 mg/mL to about 80 mg/mL, about 50 mg/mL to about 70 mg/mL.

The concentration of the lithium sulfide (Li2S) in the mixture may be in the range of about 10 mg/mL to about 60 mg/mL, about 20 mg/mL to about 60 mg/mL, about 30 mg/mL to about 60 mg/mL, about 40 mg/mL to about 60 mg/mL, about 50 mg/mL to about 60 mg/mL, about 10 mg/mL to about 50 mg/mL, about 10 mg/mL to about 40 mg/mL, about 10 mg/mL to about 30 mg/mL, about 10 mg/mL to about 20 mg/mL.

The mixture may have a S/Li2S mass ratio in the range of about 2:1 to about 5:1. For Li2S6 polysulfide synthesis, the S/Li2S mass ratio may preferably be 3.5:1.

The polysulfide (PS) solution may have a sulfur concentration in the range of about 2.0 M to about 6.0 M, about 2.5 M to about 6.0 M, about 3.0 M to about 6.0 M, about 3.5 M to about 6.0 M, about 4.0 M to about 6.0 M, about 4.5 M to about 6.0 M, about 5.0 M to about 6.0 M, about 5.5 M to about 6.0 M, about 2.0 M to about 5.5 M, about 2.0 M to about 5.0 M, about 2.0 M to about 4.5 M, about 2.0 M to about 4.0 M, about 2.0 M to about 3.5 M, about 2.0 M to about 3.0 or about 2.0 M to about 2.5 M.

The method as described herein may comprise the step of obtaining the sulfur source in fluid state by heating elemental sulfur solid at a temperature in the range of about 160° C. to about 190° C., about 170° C. to about 190° C., about 180° C. to about 190° C., about 160° C. to about 180° C. or about 160° C. to about 170° C.

The duration of the heating step may be in the range of about 5 minutes to about 40 minutes, about 10 minutes to about 40 minutes, about 15 minutes to about 40 minutes, about 20 minutes to about 40 minutes, about 25 minutes to about 40 minutes, about 30 minutes to about 40 minutes, about 35 minutes to about 40 minutes, about 5 minutes to about 35 minutes, about 5 minutes to about 30 minutes, about 5 minutes to about 25 minutes, about 5 minutes to about 20 minutes, about 5 minutes to about 15 minutes or about 5 minutes to about 10 minutes.

The present disclosure relates to a cathode material prepared by the method as described herein.

The present disclosure relates to an electrochemical cell comprising a cathode material as described herein and a liquid electrolyte. The electrolyte may be an electrolyte known in the art commonly used for a lithium-sulfur battery. The electrolyte may be prepared by adding 1 M LiTFSI and 2 wt % $LiNO_3$ to a mixture of 1,3-dioxolane (DOL) and 1,2-dimethoxyethane (DME) (volume ratio of 1:1).

The present disclosure relates to a lithium-sulfur battery comprising one or more electrochemical cells as described herein.

The cathode material may have more than 82% capacity retained over 200 cycles or an average capacity fade of about 0.09% per cycle (see examples below). At a higher sulfur loading of 5.05 mg $cm^{-2}$, the cathode material as described herein may attain a practical areal capacity of >4 mAh $cm^{-2}$ over 50 cycles.

The cathode material as described herein may give a 48% higher specific capacity and 26% lower capacity fade, as compared to conventional cathode prepared by melt-diffusion method. This difference could be attributed to the difference in morphology, surface area and Ohmic resistance, factors which are strongly influenced by how the cathodes are being prepared.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 is a schematic diagram showing the preparation of the cathode material as described herein (FIG. 1A) and the cathode material prepared by the conventional melt-diffusion method (FIG. 1B).

FIG. 2 shows SEM images under 5000× magnification of preformed rGO cathodes before PS addition: top view (FIG. 2*a*) and cross-sectional view (FIG. 2*b*).

FIG. 3 shows SEM image under 500× magnification of a preformed rGO cathode with elemental mapping: (FIG. 3*a*) SEM image, and (FIG. 3*b*) C, (FIG. 3*c*) N, and (FIG. 3*d*) O maps of preformed rGO cathode.

FIG. 4 is a number of graphs showing the electrochemical Performance of PS/rGO cathode. FIG. 4*a*: Rate capability at S=1.50 mg $cm^{-2}$. FIG. 4*b*: Long-term cycling at S=1.50 mg $cm^{-2}$ and 0.2 C, 0.5 C, 1.0 C, 2.0 C. FIG. 4*c*: Long-term cycling at 0.1 C and S=5.05 mg $cm^{-2}$.

FIG. 5 is a graph showing the specific capacities of PS/rGO cathode and S(vapor)/rGO cathode prepared by sulfur vapor deposition.

FIG. 6 is a graph showing rate capability studies of PS/rGO and S/rGO cathodes at a S loading of 1.50 mg $cm^{-2}$.

FIG. 7 is a number of graphs showing long-term cycling performance of PS/rGO and S/rGO cathodes at (a) 0.2 C, (b) 0.5 C, (c) 1.0 C and (d) 2.0 C with a S loading of 1.50 mg $cm^{-2}$.

FIG. 8 shows SEM images of PS/rGO cathode (FIG. 8*a, b*) before and (FIG. 8*c, d*) after rate capability studies. FIGS. 8*a* and 8*c* are under 1000× magnification, and FIGS. 8*b* and 8*d* are under 5000× magnification.

FIG. 9 shows SEM images of S/rGO cathode (FIG. 9*a, b*) before (FIG. 9*c, d*) after rate capability studies. FIGS. 9*a* and 9*c* are under 1000× magnification, and FIGS. 9*b* and 9*d* are under 5000× magnification.

FIG. 10 is a number of graphs showing nitrogen adsorption which was performed on PS/rGO or S/rGO cathodes in the absence of sulfur or Li—PS. FIG. 10*a*: Nitrogen adsorption/desorption isotherm. FIG. 10*b*: BJH desorption pore size distribution of of PS/rGO and S/rGO.

FIG. 11 is a graph showing cyclic voltammograms of PS/rGO and S/rGO cathodes.

FIG. 12 is a graph showing Nyquist plots of cycled PS/rGO and S/rGO cells after rate capability studies. The inset shows a high-frequency region with electrochemically fitted circuit.

DETAILED DESCRIPTION OF FIGURES

As shown in FIG. 1*a*, according to this disclosure, there is provided a slurry-coated method 10 of forming a cathode material 600 comprising a polysulfide 500, a porous conducting material 100, a carbon fiber material 200 and a binder 300. Initially, a porous conducting material 100, a carbon fiber material 200 and a binder 300 were provided, which were then subjected to a slurry forming step 12 with the addition of water. The formed slurry was then subjected to a coating step 14 to form a preformed cathode host structure 400. A sulfur source in fluid state 500 was then added to the preformed cathode host structure 400 to form the cathode material 600.

In comparison, in FIG. 1*b*, there is provided a prior art melt-diffusion method 20 of forming a cathode material 800 comprising elementary sulfur 700, a porous conducting material 100, a carbon fiber material 200 and a binder 300. Initially, a porous conducting material 100 and elementary sulfur 700 were provided, which were then subjected to a melt-diffusion step 22 to impregnate the elementary sulfur 700 into the porous conducting material 100. After that, a carbon fiber material 200 and a binder 300 were added and subjected to a slurry forming step 24 with addition of water. The formed slurry was then subjected to a coating step 26 on a support to form the cathode material 800.

EXAMPLES

Non-limiting examples of the invention will be further described in greater detail by reference to specific Examples, which should not be construed as in any way limiting the scope of the invention.

Materials and Methods

Materials: N-doped reduced graphene oxide was purchased from Nanjing JCNANO Technology Co. Ltd. (China). Vapor grown carbon fiber was purchased from Zhongke Leiming (Beijing) Science and Technology Co. Ltd. (China). LA-132 binder was purchased from Chengdu Indigo Power Sources Co. Ltd. (China). Sublimed sulfur (S), lithium sulfide ($Li_2S$), dimethoxyethane (DME) and carbon disulphide ($CS_2$) were purchased from Sigma Aldrich (Singapore).

Characterization: Field emission scanning electron microscopy (SEM) was performed on a JSM-7400F (JEOL) with energy-dispersive X-ray spectroscopy (Oxford Instruments) at an accelerating voltage of 6 kV. Fresh and spent cathode were washed with DME several times to remove LiTFSI, $LiNO_3$ salt and polysulfide, and dried under vacuum before SEM imaging. Nitrogen adsorption-desorption isotherms at −196° C. were collected using Micromeritics ASAP 2420 physiorption analyzer. Samples (~40-60 mg) were degassed at 60° C. for 12 hours before measurement. Specific surface areas were calculated using the Brunauer-Emmet-Teller (BET) method. Pore size and pore size distribution (PSD) were obtained by the BJH method using the cylindrical pore model. Pore volume was taken at $P/P_0$=0.988. Samples for physisorption were prepared by removing cathode coated on an Al current collector. The melt-diffused sulfur host cathode was washed several times with $CS_2$ to remove sulfur and dried under vacuum overnight before physisorption experiments. Elemental analysis of sulfur content was conducted on a Flashsmart elemental analyzer (Thermo Scientific).

Example 1: Cathode Preparation

The cathode formed in this example was prepared by FIG. 1A and FIG. 1B.

To prepare the preformed rGO host structure for the slurry-coated method (FIG. 1A), a mixture of 80 wt % reduced graphene oxide, 10 wt % vapor grown carbon fiber (VGCF) and 10 wt % LA-132 binder in water was stirred overnight before coating on carbon-coated Al current collector via the doctor's blade method. The solid content of the mixture is typically 4-7 wt %. Cathode host was then left to dry in a 60° C. oven for a few hours. A mass of 3.30-3.70 mg was used for the cathode.

The electrolyte was prepared by adding 1 M LiTFSI and 2 wt % $LiNO_3$ to a mixture of 1,3-dioxolane (DOL) and 1,2-dimethoxyethane (DME) (volume ratio of 1:1). $Li_2S_6$ (PS) solution was prepared by stirring a mixture of S (160.5 mg) and $Li_2S$ (46.0 mg) at 50° C. in the electrolyte overnight in an Ar-filled glovebox. Sulfur concentrations of 2.85 M and 5.42 M were prepared by adding 2 mL and 1 mL of electrolyte, respectively.

For a sulfur loading of 1.50 mg cm$^{-2}$, 21 μL of 2.85 M polysulfide solution, which was equivalent to 10 μL electrolyte/mg sulfur, was added to the preformed rGO host structure in a glovebox. Once the polysulfide solution is dropped onto the preformed rGO host structure, the preformed rGO host structure immediately absorbed the solution into its porous structure. The weight percentages of sulfur, reduced graphene oxide, VGCF and binder in the cathode were 35 wt %, 52 wt %, 6.5 wt % and 6.5 wt %, respectively.

For a sulfur loading of 5.05 mg cm$^{-2}$, 37 μL of 5.42 M polysulfide solution was added, corresponding to 64 wt % of sulfur in the cathode. Electrolyte volume per sulfur weight was fixed at 8 μL/mg for a loading density of 5.05 mg cm$^{-2}$.

Sulfur cathode via sulfur vapor deposition was prepared by placing the preformed carbon scaffold on a stainless steel mesh of about 1 mm above a heated (175° C.) reservoir of elemental sulfur for about 8 minutes corresponding to a sulfur loading density of about 1.5 mg cm$^2$. Time can be prolonged to increase the sulfur loading.

To prepare the conventional melt-diffused sulfur host cathode structure (FIG. 1B), 87 wt % S-reduced graphene oxide composite, prepared by melt diffusion at 160° C. in a hydrothermal vessel overnight, 6.5 wt % of VGCF and 6.5 wt % of LA-132 were stirred in water with a solid content in the range of 5 to 10 wt % overnight and coated on carbon-coated Al current collector via the doctor's blade method. By controlling the wet film thickness, a sulfur loading density of ~1.50 mg cm$^{-2}$ was obtained. Cathode host was then left to dry in a 60° C. oven for a few hours. The sulfur content in the sulfur-reduced graphene oxide composite was ~40 wt % based on elemental analysis. 20 μL of electrolyte (~10 μL/mg sulfur) was added to the melt-diffused S cathode.

Example 2: Coin Cell Preparation and Electrochemical Testing

Standard 2032-type coin cells were used for cell cycling and rate capability tests. Assembly was done in an argon-filled glovebox, with the 12.7-mm cathodes and lithium foil as the anode/reference electrode. A glass fiber membrane (GF/A, GE Healthcare) and a Celgard membrane, soaked with electrolyte, were used as separator. Both membranes were soaked with electrolyte. Galvanostatic charge-discharge cycling was conducted with a LAND CT2001 battery tester (Wuhan LAND electronics) between 1.6 V and 3.0 V vs. $Li/Li^+$ for the rate capability studies and at a high sulfur loading of 5.05 mg $cm^{-2}$. For a sulfur loading of 1.50 mg $cm^{-2}$, fixed rate cycling was performed between 1.8 V and 2.8 V. Cyclic voltammograms were obtained at a scan rate of 0.05 mV $s^{-1}$, and EIS was conducted at 10 mV at open circuit potential between 1 MHz and 0.01 Hz on an M204 Autolab potentiostat (Metrohm) fitted with a frequency response analyzer module.

Example 3: Cathode Characterization

Porosity and Elemental Distribution

Scanning electron microscopy (SEM) of the preformed rGO cathode before PS addition revealed a highly porous, 3D structure of interconnected VGCF tubes and crumpled rGO sheets that were well separated (FIG. 2). Elemental mapping showed that carbon, oxygen and nitrogen were homogeneously distributed throughout the material, indicating that the components were well-dispersed during cathode preparation (FIG. 3). In comparison, the cathode material of the present invention appeared more porous and less densely-packed than other slurry-coated PS cathodes reported in the literature. High porosity is important to accommodate the volumetric changes during interconversion of sulfur and $L_2S$, and provide the structure interconnectivity that is essential for long-range and rapid electron transfer. These features are important to achieve high electrochemical performance for Li—S batteries.

Robustness and Stability

To determine the robustness and stability of the PS/rGO electrode, rate capability study was conducted. The study involved increasing the charge rate from 0.1 C to 2.0 C, followed by lowering the charge rate to 0.2 C (FIG. 4*a*). The average discharge capacities of the PS/rGO electrode at 0.1 C, 0.2 C, 0.5 C, 1.0 C and 2.0 C were 1499, 1265, 1102, 999 and 879 mAh $g^{-1}$, respectively. When the charge rate was abruptly reduced to 0.2 C, the capacity recovered to 1191 mAh $g^{-1}$, indicating the high structural stability of the PS/rGO electrode. As shown in FIG. 5, the cathode material as prepared by the slurry coating method and sulfur vapor phase deposition showed similar specific capacities as compared to the cathode material as prepared by the slurry coating method and polysulfide solution addition. This indicates that the cathodes prepared by both methods are able to achieve high specific capacities and stability for lithium-sulfur battery performance due to the preformed cathode host structure.

Long Term Cycling

Long-term cycling at fixed C rates was also performed (FIG. 4*b*). The initial discharge capacities of the PS/rGO electrode were 1220, 1112, 1087 and 1007 mAh $g^{-1}$ at 0.2, 0.5, 1.0 and 2.0 C, respectively. After 200 cycles, high discharge capacities of 999, 948, 906 and 866 mAh $g^{-1}$ were retained at 0.2, 0.5, 1.0 and 2.0 C, respectively. Coulombic efficiencies are all larger than 98% throughout the 200 cycles at 0.2, 0.5, 1.0 and 2.0 C, respectively.

The above performance surpassed other slurry-coated PS reported in the literature. At 0.2 C, PS/rGO cathode gave a higher initial (1220 vs. 1000 mAh $g^{-1}$) and retained discharge capacity (999 vs. 780 mAh $g^{-1}$) at a higher S loading (1.50 vs. 1.21 mg $cm^{-2}$) and larger number of cycles (200 vs. 100), as compared to the Pt/graphene PS electrode, which showed the best performance amongst the previously reported slurry-coated PS cathodes (Table 1).[20]

TABLE 1

Electrochemical performance of slurry-coated PS cathodes.

| Cathode material | Sulfur density (mg $cm^{-2}$) | Sulfur Concentration (M) | C rate | Cycle # | Specific capacity (mAh $g^{-1}$): first cycle, last cycle | Reference |
|---|---|---|---|---|---|---|
| Super-P carbon | 1.3 | 2.25 | ~0.1 C | 50 | 610, 452 | Previous work |
| Super-P carbon | 3.03 | ~1.55 | ~0.06 C | 20 | 600, 550 | Previous work |
| Hierarchical silica-etch carbon | ~0.87 | ~1.51 | 0.1 C<br>0.2 C | 100 | 1100, 800<br>Average: ~1000 | Previous work |
| Pt/graphene | 1.21 | 4.8 | 0.1 C<br>0.2 C<br>1.0 C | 100<br>300 | 1100, 789<br>~1000, 780<br>450, 350 | Previous work |
| TiN nanoparticles | 0.32 or 0.52[a] | 1.6 | 0.1 C<br>1.0 C | 100 | 1600, 1040<br>~1200, 996 | Previous work |
| WN nanoparticles<br>$Mo_2N$ nanoparticles<br>VN nanoparticles | 0.32 or 0.52[a] | 1.6 | 0.1 C | 100 | 1768, 700<br>1000, 573<br>1068, 264 | Previous work |
| N-doped reduced graphene | 1.50<br>5.05 | 2.85<br>5.43 | 0.2 C<br>0.5 C<br>1.0 C | 100<br>200<br>200 | 1220, 1057<br>1112, 948<br>1087, 906 | This work |

TABLE 1-continued

| Cathode material | Sulfur density (mg $cm^{-2}$) | Sulfur Concentration (M) | C rate | Cycle # | Specific capacity (mAh $g^{-1}$): first cycle, last cycle | Reference |
|---|---|---|---|---|---|---|
| oxide with vapor grown carbon fiber | | | 2.0 C<br>0.1 C | 200<br>50 | 1007, 866 | |

Electrochemical performance of slurry-coated PS cathodes.

[a]Not reported, estimated based on amount of catholyte added and area of typical coin cell cathode (12.7 mm or 10 mm in diameter).

Representative reports on free-standing cathodes based on reduced graphene oxide are shown in Table S2. Although these cathodes have excellent electrochemical performance, they are difficult to scale up and often involve a low sulfur concentration (i.e. require more electrolyte). The advantage of PS/rGO cathode lies in its high scalability, while maintaining excellent electrochemical performance.

TABLE 2

Electrochemical performance of various pure carbon-based PS cathodes.

| Cathode material | Preparation | Sulfur density (mg $cm^{-2}$) | Sulfur Concentration (M)[a] | C rate | Cycle # | Specific capacity (mAh $g^{-1}$): first cycle, last cycle | Reference |
|---|---|---|---|---|---|---|---|
| N-doped reduced graphene oxide | Free-standing | 0.53<br>1.06 | 1.2<br>2.4 | 0.2 C<br>0.5 C<br>1 C<br>2 C<br>0.2 C | 100<br>100<br>100<br>100<br>100 | ~1300, ~1000<br>~900, ~700<br>Average: 600<br>Average: 400<br>~1300, ~1000 | Previous work |
| N-doped reduced graphene oxide with carbon nanotube aerogel | Free-standing | 6 | 2 | 0.25 C<br>0.5 C | 100<br>400 | 1150, 881<br>1150, 610 | Previous work |
| N-doped reduced graphene oxide with vapor grown carbon fiber | Slurry-coated | 1.50<br>5.05 | 2.85<br>5.43 | 0.2 C<br>0.5 C<br>1.0 C<br>2.0 C<br>0.1 C | 100<br>200<br>200<br>200<br>50 | 1220, 1057<br>1112, 948<br>1087, 906<br>1007, 866<br>858, 798 | This work |

Areal Capacity

To determine if the PS/rGO electrode could reach a practical areal capacity as LIB (4 mAh $cm^{-2}$), sulfur loading density was increased. Low sulfur utilization was expected at high sulfur loadings due to a thicker layer of insulating sulfur on the cathode surface. At 0.1 C, a sulfur loading of 5.05 mg $cm^{-2}$, and a high sulfur concentration of 5.43 M, the PS/rGO electrode gave an initial specific capacity of 858 mAh $g^{-1}$, corresponding to an areal capacity of 4.33 mAh $cm^{-2}$ (FIG. 4*c*). After 50 cycles, 798 mAh $g^{-1}$ was retained, equivalent to an areal capacity of 4.03 mAh $cm^{-2}$. Based on the electrochemical performance results, the PS/rGO cathode is capable of achieving a practical areal capacity comparable to current LIB technology, and a superior electrochemical performance to other slurry-coated PS electrode.

Comparative Example 1: Discharge Capacities

To address the difference between the distinctly different method of preparing PS (FIG. 1A) and melt-diffused (FIG. 1B) cathodes, the electrochemical performance of the S/rGO was also evaluated. The discharge capacities of S/rGO cathode were 1186, 920, 810, 739 and 650 mAh $g^{-1}$ at 0.1, 0.2, 0.5, 1.0 and 2.0 C, respectively, and recovered to 872 mAh $g^{-1}$ at 0.2 C (FIG. 6).

For long-term cycling of the S/rGO cathode, initial discharge capacities were 867, 821, 747 and 659 mAh $g^{-1}$ at 0.2, 0.5, 1.0 and 2.0 C, respectively (FIG. 7). After 200 cycles, the discharge capacities became 653, 650, 605 and 533 mAh $g^{-1}$ at 0.2, 0.5, 1.0 and 2.0 C, respectively.

Coulombic efficiencies are larger than 98% for both the PS/rGO cathode and the S/rGO cathode throughout the 200 cycles at 0.2, 0.5, 1.0 and 2.0 C, respectively.

Capacity fade, known to be positively correlated with PS shuttling effect, was also determined for the two electrodes. Capacity fade values for the PS/rGO electrode were 0.100%, 0.080%, 0.091%, 0.075% per cycle at 0.2, 0.5, 1.0 and 2.0 C, respectively. For the S/rGO electrode, the capacity fade values were 0.142%, 0.117%, 0.105% and 0.106% per cycle at 0.2, 0.5, 1.0 and 2.0 C, respectively.

PS/rGO electrode showed a 48% higher specific capacity and 26% lower capacity fade per cycle, on average, than the S/rGO electrode.

Comparative Example 2: SEM

The difference in electrochemical performance was found to be correlated to the difference in cathode structure. The PS/rGO cathode was highly porous and interconnected before (FIG. 8*a, b*) and after cycling (FIG. 8*c, d*). The pores were uniform in size and evenly distributed, suggesting that the reversible reaction of Li—S system during battery cycling did not affect the porous structure of the PS/rGO cathode.

On the other hand, fresh S/rGO cathode structure, although interconnected, consisted of a mixture of large and small pores (FIG. 9*a, b*). After the rate capability test, the cathode underwent a major structural transformation, forming a highly dense and closely packed structure (FIG. 9*c, d*). Structural changes were known to occur for composite sulfur cathodes due to the dissolution of sulfur to PS species during battery discharge.

Comparative Example 3: Nitrogen Adsorption Study

The difference in structure of the two electrodes was quantified by nitrogen adsorption which was performed on both cathodes in the absence of sulfur or Li—PS. Sulfur removal was necessary to simulate the effect of structural changes observed in SEM. For the PS/rGO cathode, analysis was conducted on the preformed rGO cathode, whereas the S/rGO cathode was washed with $CS_2$ to remove the sulfur.

The nitrogen adsorption/desorption isotherm for both cathodes corresponded to a type II isotherm with H3 hysteresis loop (FIG. 10*a*). The surface area and pore volume of the preformed rGO cathode were 264 $m^2/g$ and 0.31 $cm^3/g$, respectively. These values were higher than that of the washed S/rGO cathode (181 $m^2/g$ and 0.25 $cm^3/g$, respectively).

In addition, as shown in FIG. 10*b*, pore size distribution analysis revealed the presence of mesopores (3-4 nm) and macropores (60-90 nm) for both cathodes. The rGO cathode had a comparable mesopore size (3.5 vs. 3.6 nm) and slightly larger macropore size (82 nm vs. 65 nm) than the washed S/rGO cathode.

Since both electrodes were essentially identical in terms of composition, electrolyte volume and sulfur loading density, the higher specific capacities and lower capacity fade values could be attributed to the higher surface area of the PS/rGO cathode as compared to the S/rGO cathode.

The higher surface area of the PS/rGO cathode led to an increased availability of electrochemically active sites for sulfur species, such as S, $Li_2S$ and PS, allowing both nucleation and binding to occur on the cathode surface, which led to higher specific capacities. This in turn led to a decrease in the concentration of dissolved PS in bulk, reducing the undesired PS shuttling effect. Therefore, the capacity fading of PS/rGO electrode was found to be lower than that of the S/rGO electrode.

Comparative Example 4: Electrochemistry

In addition to surface area difference, the structural change, or the lack thereof, was found to have a pronounced effect on ohmic resistance of the electrodes. Both S/rGO and PS/rGO electrodes were further examined using cyclic voltammetry (CV) and electrochemical impedance spectroscopy (EIS), measured after rate capability studies.

CV curves of both electrodes revealed features typical of a Li—S battery system: two sharp reduction peaks and a broader oxidation peak (FIG. 11). Peak shape of both cathodes resembled one another as these electrodes consisted of essentially identical constituents, ratios and S loading (which is fixed at 1.50 mg $cm^{-2}$). This implied that the structural difference between these cathodes did not affect the potential at which redox reactions occurred. The area under the curve, typically correlated with capacity, was found to be larger for the PS/rGO cathode as compared to the S/rGO cathode, which was consistent with the galvanostatic cycling results discussed earlier.

EIS data collected were mathematically transformed into Nyquist plots (FIG. 12). In general, these plots appeared to be an overlap of several semicircles ending with a steep upward slope. The semicircle at the high frequency region was fitted with an equivalent circuit (FIG. 9 inset). The first intercept at the high frequency region of the real (Z') axis gives the value of electrolyte resistance, $R_e$. The difference between the Z' axis intercepts of the fitted semicircles gives the charge transfer resistance ($R_{CT}$) value, which is associated with charge transfer process between S and the electrode.

The $R_e$ values of PS/rGO and S/rGO cells were found to be 4.7Ω and 7.4Ω, respectively. The $R_{CT}$ values of PS/rGO and S/rGO cells are 3.0Ω and 7.8Ω, respectively. Since PS/rGO cathode has a higher surface area than the S/rGO cathode, the amount of electrochemically active sites would be greater in PS/rGO than S/rGO. Therefore, for the same amount of electrolyte, the insulating S layer would be thinner in PS/rGO than S/rGO, resulting in a lower resistance.

In addition, structural changes that occurred in the S/rGO cathode could lead to disconnectivity between conductive elements within the cathode, contributing to the higher resistance as compared to the PS/rGO cathode. In the structurally intact PS/rGO cathode, the conductive elements within the structure remained interconnected, allowing continuous and unimpeded electron conduction pathways from the current collector throughout the entire 3D cathode structure.

The lower ohmic resistance of the PS/rGO electrode, as compared to the S/rGO cathode, suggested better redox kinetics that resulted in the improved rate and cycling performance of the Li—S batteries (FIGS. 3 and 4).

INDUSTRIAL APPLICABILITY

In the present disclosure, the cathode material can be used in a lithium-sulfur (Li—S) battery system for energy storage application. It offers potential advantages of high energy density, low material cost and high abundance of sulfur as compared to the conventional lithium battery. The cathode material and the method of preparing the same provide a strong case towards a paradigm shift away from conventional cathode preparation approaches to improve the electrochemical performance of lithium-sulfur batteries.

The lithium-sulfur batteries that use the cathode material as described in the present disclosure may be used as high density power sources for a wide variety of applications for example in automobile (electric vehicles including electric cars, hybrid vehicles, electric bicycles, personal transporters and advanced electric wheelchairs, radio-controlled models, model aircraft, aircraft), portable devices (mobile phone/smartphone, laptops, tablets, digital cameras and camcorders), in power tools (including cordless drills, sanders, and saws), or in healthcare (portable medical equipment such as monitoring devices, ultrasound equipment, and infusion pumps).

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A cathode material comprising a layer of sulfur species dispersed within or thereon a porous matrix comprising a first conducting carbon material, a second conducting carbon material and a binder, wherein the binder is a copolymer of acrylamide, lithium carboxylate and cyano group, the second conducting carbon material is carbon fiber or carbon nanotube, and said porous matrix is interconnected with uniform pores.

2. The cathode material according to claim 1, wherein the sulfur species is a polysulfide or elemental sulfur.

3. The cathode material according to claim 1, where the polysulfide has a formula of $Li_2S_n$, wherein $2<n\leq 8$.

4. The cathode material according to claim 1, wherein the cathode material has a sulfur content in the range of about 30 wt % to about 80 wt % based on the total weight of the cathode material.

5. The cathode material according to claim 1, wherein the first conducting carbon material is selected from the group consisting of reduced graphene oxide, graphene, graphite, carbon nanotube, carbon fiber, acetylene black, and ketjenblack; wherein the first conducting carbon material is doped with nitrogen, oxygen, sulfur, boron, phosphorus or their mixtures thereof; or is different from the second conducting material.

6. The cathode material according claim 1, wherein the first conducting carbon material is reduced graphene oxide.

7. The cathode material according claim 1, wherein the amount of the first conducting carbon material is in the range of 20 wt % to 60 wt % based on the total weight of the cathode material.

8. The cathode material according claim 1, wherein the binder is water soluble.

9. The cathode material according to claim 1, wherein the amount of the binder is in the range of 5 wt % to 15 wt % based on the total weight of the cathode material.

10. The cathode material according to claim 1, wherein the second conducting carbon material is vapor grown carbon fiber (VCGF); or has a diameter in the range of about 0.1 nm to about 100 μm.

11. The cathode material according to claim 1, wherein the amount of the second conducting carbon material is in the range of 5 wt % to 35 wt % based on the total weight of the cathode material.

12. The cathode material according to claim 1, wherein the cathode material has a sulfur loading density in the range of 1.3 mg $cm^{-2}$ to 15 mg $cm^{-2}$; a surface area in the range of 200 $m^2/g$ to 900 $m^2/g$; a pore volume in the range of 0.25 $cm^3/g$ to 3 $cm^3/g$; or a pore size distribution of mesopore size in the range of 2.0 nm to 50 nm and macropore size larger than 50 nm.

13. An electrochemical cell comprising a liquid electrolyte, and a cathode material comprising a layer of sulfur species dispersed within or thereon a porous matrix comprising a first conducting carbon material, a second conducting carbon material and a binder, wherein the binder is a copolymer of acrylamide, lithium carboxylate and cyano group, the second conducting carbon material is carbon fiber or carbon nanotube, and said porous matrix is interconnected with uniform pores.

14. A lithium-sulfur battery comprising one or more electrochemical cells, each electrochemical cell comprising a liquid electrolyte, and a cathode material comprising a layer of sulfur species dispersed within or thereon a porous matrix comprising a first conducting carbon material, a second conducting carbon material and a binder, wherein the binder is a copolymer of acrylamide, lithium carboxylate and cyano group, the second conducting carbon material is carbon fiber or carbon nanotube, and said porous matrix is interconnected with uniform pores.

15. A method for preparing a cathode material comprising:

a) coating a support with a slurry formed by mixing a mixture of a first conducting carbon material, a second conducting carbon material and a binder, wherein the binder is a copolymer of acrylamide, lithium carboxylate and cyano group, and the second conducting carbon material is carbon fiber or carbon nanotube; and b) adding a sulfur source in solution or gaseous state to the coated support to form a layer of sulfur species dispersed within or thereon the coated support to thereby obtain the cathode material, wherein the coated support is a porous matrix comprising the first conducting carbon material, the second conducting carbon material and the binder, and said porous matrix is interconnected with uniform pores.

16. The method according to claim 15, further comprising, before said coating operation (a), the operation of (a1) stirring said mixture in a solvent overnight with a solid content in the range of 3 wt % to 10 wt %, wherein the solvent is water or water mixture with polar organic solvents.

17. The method according to claim 15, wherein the first conducting carbon material is reduced graphene oxide; or has a concentration in the range of 60 wt % to 90 wt % based on the total weight of solid content in the slurry.

18. The method according to claim 15, wherein the second conducting carbon material has a concentration in the range of 5 wt % to 50 wt % based on the total weight of solid content.

19. The method according to claim 15, wherein the binder has a concentration in the range of 5 wt % to 20 wt % based on the total weight of solid content.

20. The method according to claim 15, further comprising, after said coating operation (a), the operation of (a2) drying the coated support at a temperature in the range of 40° C. to 80° C. for more than 2 hours.

21. The method according to claim 15, comprising preparing a polysulfide (PS) solution as the sulfur source in fluid state by stirring a mixture of sulfur (S) and lithium sulfide ($Li_2S$); wherein the mixture has a $S/Li_2S$ mass ratio in the range of 2:1 to 5:1; and/or is stirred at a temperature in the range of 40° C. to 60° C. overnight in a glovebox.

22. The method according to claim 15, comprising the operation of obtaining said sulfur source in fluid state by heating elemental sulfur solid at a temperature in the range of 160° C. to 190° C. at a duration in the range of 5 minutes to 40 minutes.

* * * * *